United States Patent [19]

Killian, Jr.

[11] 4,395,748
[45] Jul. 26, 1983

[54] DETACHABLE FLASH ACCESSORY FOR PHOTOGRAPHIC APPARATUS

[75] Inventor: John C. Killian, Jr., Sudbury, Mass.

[73] Assignee: Polaroid Corporation, Cambridge, Mass.

[21] Appl. No.: 220,897

[22] Filed: Dec. 29, 1980

[51] Int. Cl.³ .............................................. G03B 15/02
[52] U.S. Cl. .......................................... 362/8; 362/3; 354/145
[58] Field of Search .................. 362/3, 8, 9; 354/145, 354/295

[56] References Cited

U.S. PATENT DOCUMENTS

| | | | |
|---|---|---|---|
| 3,407,717 | 10/1968 | Ernisse | 362/3 |
| 4,106,077 | 8/1978 | Furda | 362/3 |
| 4,110,770 | 8/1978 | Lange | 354/295 |

*Primary Examiner*—Donald P. Walsh
*Attorney, Agent, or Firm*—Leslie J. Payne

[57] ABSTRACT

A flash accessory is disclosed being releasably attachable to a photographic camera. The accessory includes a housing having a unitary latching member with a finger-engageable portion at one end and a spring portion at the other end and at least one depending finger carrying at its distal end a latching formation. The spring portion engages a section of the housing so as to bias the finger in one direction. During mounting of the accessory to the camera, the latching finger engages the camera in a manner that overcomes the biasing force of the spring portion and moves the finger and member in the opposite direction. When the finger reaches a latchable condition, the spring portion causes the finger to tightly engage with a latching section formed on the camera. Release of the latching finger is initiated by manually displacing the finger-engageable portion in the opposite direction to overcome the biasing force provided by the spring portion.

3 Claims, 7 Drawing Figures

DETACHABLE FLASH ACCESSORY FOR PHOTOGRAPHIC APPARATUS

BACKGROUND OF THE INVENTION

This invention relates to the field of photography and, more specifically, artificial illumination accessories for photographic camera apparatus.

It is well known to provide photographic apparatus with artificial illumination means. Generally, one approach has a flash accessory mountable on the photographic apparatus. Examples of such photographic flash accessories are disclosed in the following commonly assigned U.S. Pat. Nos.: 2,898,447, 3,757,643, 3,967,302, 4,040,069, 4,064,519, 4,085,414, 4,179,205, and 4,185,905. As will be observed from these patents, many approaches exist for releasably coupling the flash units to camera housings.

It will be apparent that with such accessories, it is important for a variety of reasons that they be attached and detached to the camera with a minimum amount of manipulation. Further, these accessories should be as compact as possible so as not to overburden the photographer with their attachment and/or use. Further, additional difficulties arise in mounting these flash accessories so that they do not obscure any of the camera elements. Many of the noted flash units include a pair of flexible snap-like fasteners which are attached to the exterior configuration of the camera housing. With snap-like fasteners there is, however, a tendency for them to suffer damage after repeated use. Significantly, therefore, the accessories should be constructed so that attachment and detachment can be reliably and repeatedly performed without affecting structural integrity. Furthermore, it is extremely critical that these accessories be securely mounted in an intended position. This is so because it is important that the pulse of artificial illumination generated thereby be properly directed at the subject for achieving the desired lighting effects.

Moreover, there is the general requirement that the manufacturing costs of the accessory be kept to a minimum. Thus in satisfying these requirements the accessory must be manufactured without complex structural components or component organizations which pose problems and add costs to manufacturing assembly.

SUMMARY OF THE INVENTION

It is an object of the present invention to provide a flash illuminating accessory for use with a photographic camera having an opening therein for providing access to a latching formation. Included in the accessory is a housing enclosing an energizable source of illumination, and means for mounting the accessory on the camera. Included in the mounting means is a unitary latching member comprising an elongated body having a finger-engageable portion located at one end and a spring portion at the other end of the body. Depending from the body is a latching finger carrying at its distal end a latching formation facing in the direction of the finger-engageable portion. Means for mounting the body for slidable movement in the housing is provided with the spring portion engaging a section of the housing so as to bias the body in the direction of said finger-engageable portion and with the latching finger extending from the housing whereby the accessory is mounted on the camera by insertion of the latching finger in the opening to engage its latching formation with the latching formation of the camera. Release of the accessory from the camera is effected by engaging the finger-engageable portion and urging the body in the direction of the spring portion thereby disengaging the latching formations.

Among the other objects of the invetion are, therefore, the provision of an improved accessory for use with image recordable apparatus; the provision of an improved artificial illumination accessory for use with photographic apparatus; the provision of an improved flash accessory for use with photographic cameras which accessory has latching means for permitting convenient, reliable and repeatable mounting and demounting on and from the camera.

Other objects and further scope of applicability of the present invention will become apparent from the detailed description to follow when taken in conjunction with the accompanying drawings wherein like parts are indicated by like reference numerals throughout the several views.

DETAILED DESCRIPTION

Figures 1, 2:
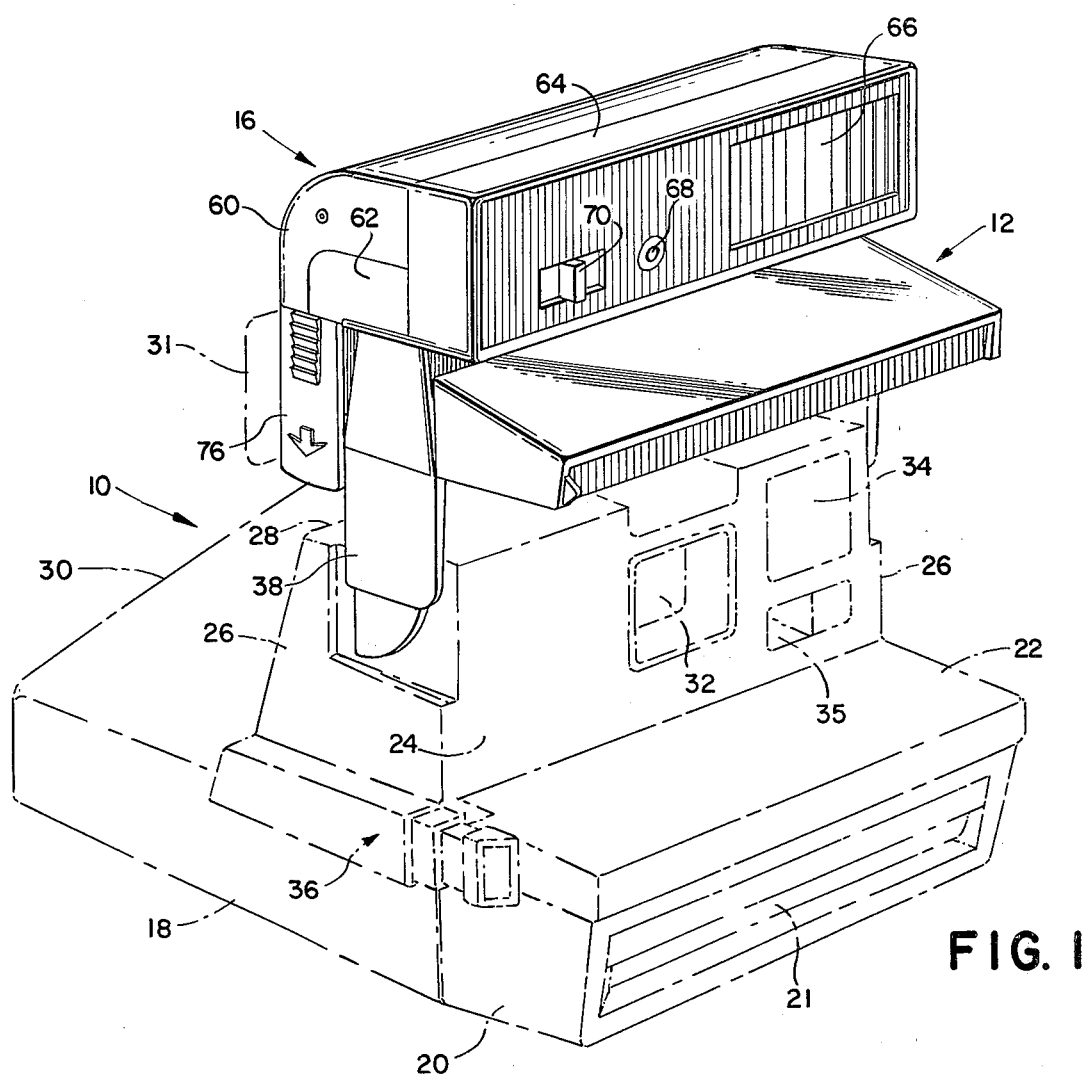
FIG. 1 is a perspective view showing the improved flash illumination accessory of the present invention mounted on a photographic camera apparatus.
FIG. 2 is a planar cross-sectional view illustrating details forming part of the accessory.

Reference is made to FIG. 1 showing a photographic camera apparatus 10 having a folding flash holder 12 pivotally attached to the camera housing 14 so as to move between erect (FIG. 1) and non-erect (not shown) positions. Removably mounted on the flash holder 12 is the improved artificial illumination or flash accessory of the present invention being designated by reference numeral 16.

Referring back to the camera 10, it is of a generally well-known instant or self-developing type, such as disclosed in commonly assigned U.S. Pat. No. 4,231,645 issued to Carl W. Davis et al. on Nov. 4, 1980. Briefly, such a camera includes housing 14 having at the lower end thereof a base section 18 and pivotally attached to this base section is a loading door 20. When the door 20 is opened (not shown), a film pack (not shown) containing individual film units (not shown) may be loaded into the base section 10. The loading door 20 is provided with a film unit withdrawal slot 21 for permitting exiting of the film units. For a representative example of such a film pack, see commonly assigned U.S. Pat. No. 3,877,045. The upper front portion of the camera housing 14 includes an apron section 22 which extends rearwardly to a forwardly facing and generally upstanding lens mounting wall 24. Joining the lens mounting wall 24 is a pair of side walls 26, and a top wall 28. The top wall 28 joins with an inclined rear wall 30 to form an interior exposure chamber (not shown). Extending rearwardly from the top wall 28 is a viewfinder tube 31.

Presented in the front face with the lens mounting wall 24 are various optical components including the objective lens 32 and a viewfinder lens 34 which along with the viewfinder tube 31 form a viewfinding system. The lens mounting wall 24 may include other elements associated with automatic exposure control, such as a photocell window 35. In the illustrated camera, an actuating arrangement 36 is formed on the side wall 26 and has a pair of sliding switch actuators which are mounted in telescoping relation for sequential operation for flash and ambient exposure modes. Operation of such actuators for effecting flash and ambient exposure is more fully described in U.S. Pat. No. 4,231,645.

Figure 3:
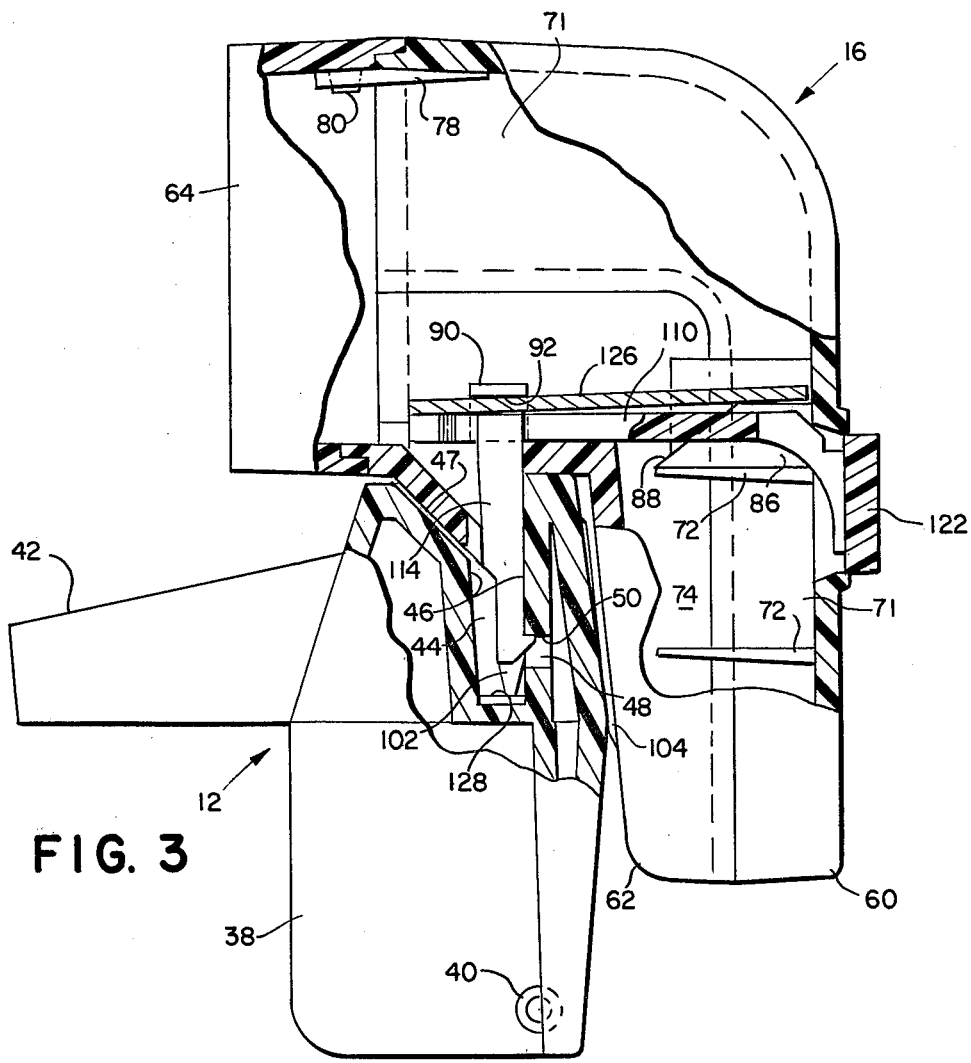
FIG. 3 is an enlarged side elevational view, partly in section, illustrating the accessory in a latching condition.
Figure 4:
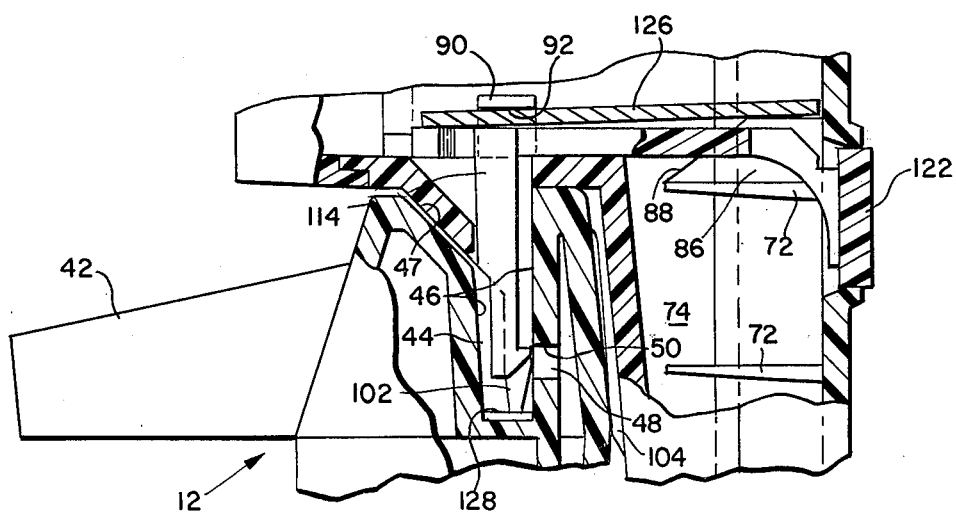
FIG. 4 is an enlarged fragmentary side elevational view, partly in section, illustrating latch release.
Figure 5:
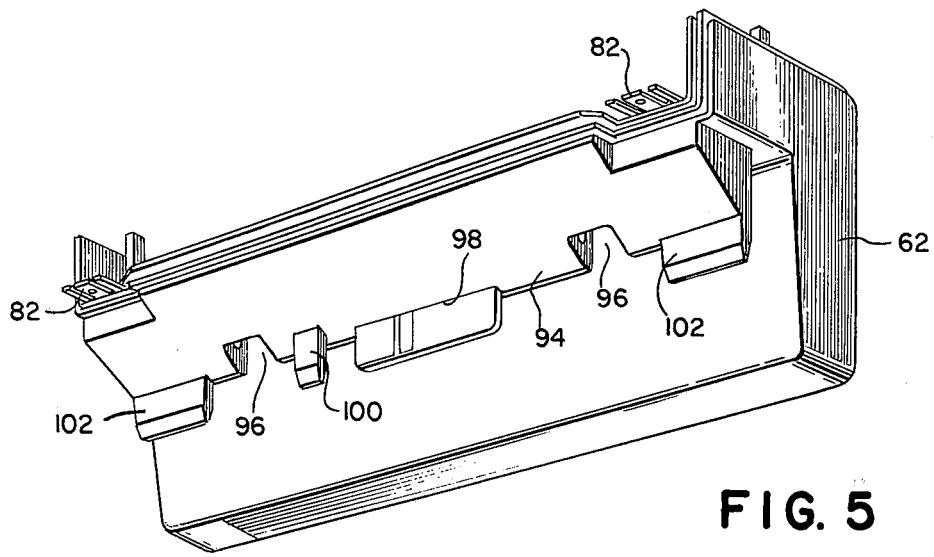
FIG. 5 is a perspective view illustrating a bottom housing portion of the improved flash accessory.

Turning back to the flash holder 12, it includes a pair of opposed side walls 38 having on the inward sides thereof a pintle 40 which cooperates with a side opening (not shown) formed in the side walls 26 so as to allow for the pivoting movement between an erect position and the folded or non-erect position. Since the flash holder 12 does not, per se, form part of this invention, only those features thereof necessary for an understanding of the present invention will be given. However, for a more detailed description of such a flash holder 12 and the manner in which it interfaces with the camera and a flash accessory reference is made to copending and commonly assigned application Ser. No. 175,422, filed Aug. 5, 1980, by Bruce K. Johnson et al., entitled "Flash Holder Assembly Arrangement." The primary function of the holder 12 is, of course, to receive and support in mounted fashion the flash accessory 16. Extending from the forward surface of the flash holder 12 is a covering hood 42. When the holder 12 is in its non-erect position (not shown), the hood 42 effectively serves to cover and protect the components located on the lens mounting wall 24. Included in the flash holder 12 is a generally elongated receptacle well 44 which is generally constructed and sized to receive and support the flash accessory 16 in a manner to be described. The flash holder 12 includes the necessary electrical connections (not shown) for purposes of connecting the flash accessory 16 to the appropriate internal operational components within the camera housing 14. The receptacle well 44 is defined by internal wall surfaces 46 including tapered surface 47. Also formed in the receptacle well 44 is a pair of spaced apart latching recesses 48, one of which is shown in FIGS. 3 and 4, provided with latching formations or surfaces 50. The well receptacle 44 has an enlarged mouth of suitable size and configuration for facilitating mounting and demounting of the flash accessory 16.

Reference is made to FIGS. 1–5 for showing the improved flash accessory 16 and the manner by which it is releasably attached to the flash holder 12. Such accessory 16 includes a housing assembly comprised of mating first and second housing sections 60, 62 and mating front panel 64. The front panel 64 includes a strobe lens 66, which protects a flash tube F that provides a means of artificial illumination, a photocell window 68, and a slider 70 for moving a trim filter (not shown) into and out of the path of light passing through the window leading to the photocell (not shown). Many of the electrical and electronic components forming a part of the flash accessory 16 have been omitted for purposes of clarity since they do not, per se, form part of the present invention.

As assembled, the first and second housing sections 60, 62, respectively, define a hollow interior 71. Interior laterally extending fins 72 (FIGS. 3, 4) on the housing section 60 define internal battery compartments 74 for receipt of suitably sized batteries that power the flash accessory 16. A side access door 76 is pivotally connected to the sections 60, 62. It can be pivoted upwardly to the open condition (not shown) from the closed condition (FIG. 1). This permits installation and removal of the batteries from the compartments 74. For attaching the front panel 64 to the sections 60, 62 there are provided a pair of spaced apart ears 78, one of which is shown in FIG. 3, on the section 62 which interlock with panel lugs 80 on the front panel 64. Also, retaining elements 82 (FIG. 2) on the front of the section 62 retain a screw fastening element (not shown) for cooperating with a screw type fastener, also not shown, which serve to fixedly secure the section 62 to the front panel 64.

Now turning back to the housing section 60 and to FIGS. 2–4, such section is seen to include a rear button opening 84, a plurality of riser members 86 having chamfered lead-in surfaces 88, and side ribs 90 having circuit-board cut-outs 92.

With continued reference to the housing section 62 it basically includes a tapered wall conformation 94, a pair of latch finger openings 96, connector plate opening 98, and connector plate fingers 99 (FIG. 7), flash actuating finger 100, locating lugs 102 having tapered end conformations, wedging members 104, retaining fingers 106 and biasing abutment members 108.

Figure 6:
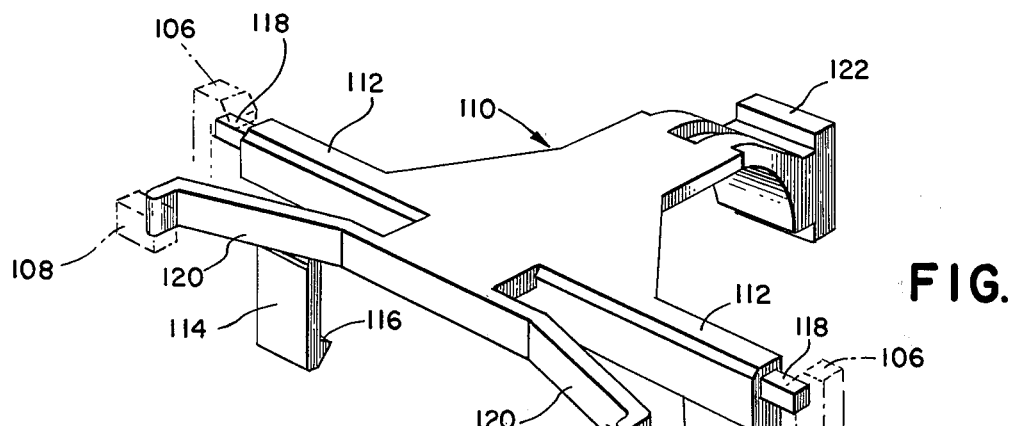
FIG. 6 is a perspective view showing the improved latching arrangement of the present invention; and, FIG. 7 is a fragmentary perspective view illustrating other details of the flash accessory.

Reference is now made to FIGS. 2 and 3 as well as FIG. 6 for illustrating the improved latching arrangement of this invention. As shown, it includes an integral generally longitudinal latching body member 110 having a pair of transversely extending yoke arms 112 each with depending latch fingers 114. The latching fingers 114 are arranged to extend through corresponding latch finger openings 96 and are movable therein. The latching body 110 is free to slide longitudinally on the bottom wall of the housing section 62. Each of the latching fingers 114 has a latching conformation 116 at its distal end for cooperating with the latching surfaces 50. Preferably, each of the fingers 114 is made of a resiliently flexible plastic material which is flexible enough to allow limited flexing movement. Such flexing occurs when the fingers 114 are entering the receptacle well 44 and engage the inner wall surfaces 46 during mounting. When the latching surfaces 116 are cooperable with the recesses 48, they will be snapped into latching engagement by virtue of the inherent resiliency of the fingers. Also, the materials forming the fingers 114 and the flash holder 12 provide an audible snapping sound during actual latching. This sound alerts the user to the fact that the flash accessory 16 is properly latched. Also, each yoke 112 has a retaining stub 118 which is retained by the flexible retaining or mounting fingers 106. These retaining fingers 106 cooperate and guide each of the stubs 118 for facilitating reciprocal planar movement of the latching body 110 in its desired horizontal plane of movement.

Also, as is best shown in FIG. 6, the latching body 110 includes a pair of cantilevered biasing or spring finger members 120 extending from its front face in splayed fashion. These spring or biasing fingers 120 are made of a resiliently flexible plastic material. When the latching body 110 is in the assembled condition, the distal ends of the biasing fingers 120 engage the corresponding biasing abutments 108. The abutments 108 provide reaction forces so that the fingers 120 pre-bias the latching body 110 longitudinally rightwardly until the fingers 114 engage the walls defining the latch openings 96. This is normal at rest condition. Because of the pre-biasing, the latching fingers 114 will be urged into continuous contact with the wall surfaces 46 defining the well 44 during mounting of the flash accessory 16. The internal wall surfaces 46 will, by virtue of their construction, provide resistance to insertion of the fingers 114. This resistance overcomes the pre-biasing forces of the biasing fingers 120. This causes the latching body 110 to move longitudinally in a manner which generally tends to compress the biasing fingers against the biasing abutments 108. This continues until the latching conformations 116 are latchingly cooperable with the latching recesses 48. When this occurs, the biasing fingers 120 are free to displace the latching body 110 in the opposite longitudinal direction so that the latching formation 116 comes into latching engagement with the latching surfaces 50.

It will be observed in FIGS. 3 and 4 that the release button 122 is formed integral with the latching body 110. The release button 122 is accessible from the exterior of the camera through the rear button opening 84. Thus, an operator's finger can engage the button 122 for effecting displacement of the latching body 110 and ultimate release of the latching fingers 114. The release button 122 has a snug fit in the button opening 84. The top and bottom of the release button 122 engage the housing section walls defining the opening, the retaining fingers 106 engage the stubs 118, and the bottom wall of the housing section 62 provide means for simply mounting and maintaining the latching body 110 in a horizontal plane for the noted longitudinal reciprocal movement. Advantageously, this simple cooperation greatly minimizes sliding friction.

Figure 7:
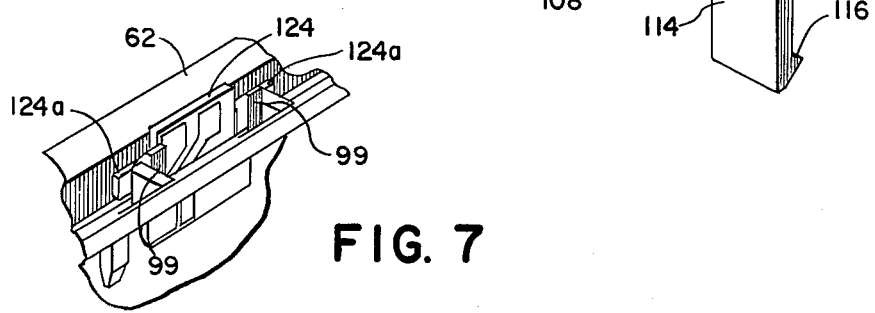

Reference is now made to FIG. 7 for illustrating the manner in which the electrical connector plate 124 is secured in the housing section 62. This electrical connector plate 124 serves to electrically interconnect the electronic components of the flash accessory 16 with the appropriate camera circuitry so that the two can functionally interrelate. Such cooperation is described more fully in the last-noted copending application. This connector plate 124 extends through the connector plate opening 98 and has a pair of upper arms 124a which are supported by interior walls of the housing section 62. For securing the connector plate 124 to the housing section 62 and for restraining upward plate movement, the connector plate fingers 99 are provided. These fingers 99 are resiliently flexible and provide a snap-fit connection of the connector plate 124 to the housing section 62.

Reference is now made to FIGS. 3 and 4 for illustrating the manner by which the printed circuit board 126 is secured to the flash accessory 16 without the need for screws or snap-fasteners and the like. Initially, it should be pointed out that the circuit board 126 is electrically connected by means not shown to the connector plate 124. The printed circuit board 125 is fabricated out of relatively bendable material. The installing the circuit board 126, opposing longitudinal ends thereof are slid into the corresponding circuit board cut-outs 92. Thereafter, continued sliding movement of the circuit board 126 causes it to contact and ride-up the tapered lead-in surfaces 88, formed on the risers 86 until the board engages the rear wall of the housing section 60. The cut-outs 92 and risers 86 are formed such that when the circuit board 126 is being forced through the cut-outs, the risers will cause a slight upward bending of the board. Such action wedges the circuit board 126 tightly within the accessory housing.

The operation of the above embodiment is believed apparent from the foregoing description. To supplement such description, however, the following brief description is given. For mounting the flash accessory 16 to the flash holder 12, the locating lugs 102 are initially positioned into receptacle well 44. These lugs 102 bottom on ribs 128 formed in the bottom of the well 44 (see FIG. 3). Moreover, the lugs 102 are constructed to facilitate entry and alignment of the accessory within the receptacle well 44. In this connection, the lugs 102 correctly position the latching fingers 114 opposite the latching recesses 48. During this downward movement of the flash accessory 16, the fingers 114 engage a converging inner wall surface 46. This engagement causes flexing of the fingers 114 as well as displacement of the latching body 110 against the pre-biasing of the biasing fingers 120. As earlier noted, when the latching conformations 116 are cooperable with the latching recesses 48 and the latching surfaces 50, the combined effect of the biasing fingers 120 and the inherent resiliency of the latching fingers 114 cause a tight latching engagement. It will be noted, of course, that the biasing fingers 120 displace the latching body 110 so that the latching fingers 114 are tightly engaged. For further insuring proper installation and orientation of the flash accessory 16, the wedging members 104 which have an increasing cross-sectional thickness from bottom to top tightly engage and even slightly compress the upper wall body of flash holder 12 which defines part of the receptacle well 44.

For effecting release of the flash accessory 16, the release button 122 is manually depressed inwardly. This action overcomes the biasing force provided by the biasing fingers 120 sufficiently to displace laterally the latching fingers 114 from the latching recesses 48, (see FIG. 4). Thereafter, upward displacement of the flash accessory 16 operates to remove the latching finger 114 from the receptacle well 44. Once the accessory 16 is clear of the flash holder 12, the release button 122 is moved outwardly relative to the opening 84 under the influence of the spring or biasing fingers 120 and the fingers 114 resume their normal pre-bias position.

Since certain changes may be made in the above-described apparatus without departing from the scope of the invention herein involved, it is intended that all matter contained in the description or shown in the accompanying drawings shall be interpreted as illustrative and not in a limiting sense.

I claim:

1. A flash illuminating accessory releasably attachable to a photographic camera apparatus of the type having an opening therein for providing access to a camera latching formation and having camming surfaces adjacent the latching formation, said accessory comprising a housing having a plurality of openings and enclosing an energizable source of illumination; and means for mounting said accessory on said camera, said mounting means including a unitary latching body mounted for movement in and relative to said housing, said unitary body having a finger-engageable portion being accessible through a first of said housing openings, said unitary body having a biasing portion being formed generally opposite said finger-engageable portion along a given axis and cooperable with said housing to bias said unitary body in one direction to an initial condition, said unitary body having a latching finger extending from said body outwardly from a second housing opening for selective latching cooperation with the camera latching formation, said biasing portion allowing said body to move, in response to forces urging said body in a direction opposite the one direction along the given axis as said finger engages the camming surface, from the initial position to a prelatching condition, and then urging said body and finger in the one direction so that said finger can latchingly cooperate with the camera latching formation, said finger-engageable portion being selectively movable in the opposite direction for allowing overcoming of the biasing force, so as to thereby allow release of said finger from the camera latching formation.

2. The accessory of claim 1 wherein said member includes a body wherein said finger-engageable portion and said biasing portion are located at opposed ends of said given axis, said mounting means includes a pair of yoke arms located at opposite ends of an axis transverse to said given axis, and said latching body includes a pair of latching fingers spaced along said transverse axis.

3. The accessory of claim 1 wherein said biasing portion includes a pair of cantilevered biasing arm members in a splayed arrangement with respect to each other such that their free ends extend away from said finger-engageable portion.

* * * * *